(12) United States Patent
Arora et al.

(10) Patent No.: US 12,367,109 B2
(45) Date of Patent: *Jul. 22, 2025

(54) MAKING TRANSMISSION CONTROL PROTOCOL (TCP) SESSIONS ROBUST IN A SOCKET REPLICATION ENVIRONMENT

(71) Applicant: Juniper Networks, Inc., Sunnyvale, CA (US)

(72) Inventors: Amit Arora, Bangalore (IN); Erin C. MacNeil, Carp (CA); Harmeet Singh, Bangalore (IN); Sairam Neelam, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,937

(22) Filed: Dec. 29, 2023

(65) Prior Publication Data

US 2024/0134751 A1 Apr. 25, 2024

Related U.S. Application Data

(63) Continuation of application No. 17/837,355, filed on Jun. 22, 2022, now Pat. No. 11,886,304.

(51) Int. Cl.
*G06F 11/00* (2006.01)
*G06F 11/07* (2006.01)
*G06F 11/14* (2006.01)

(52) U.S. Cl.
CPC ...... *G06F 11/1464* (2013.01); *G06F 11/0757* (2013.01); *G06F 11/1451* (2013.01)

(58) Field of Classification Search
CPC ............ G06F 11/1464; G06F 11/0757; G06F 11/1451
See application file for complete search history.

(56) References Cited

U.S. PATENT DOCUMENTS

| | | | | |
|---|---|---|---|---|
| 9,491,107 | B1 * | 11/2016 | Scudder | ................. H04L 45/28 |
| 11,886,304 | B2 * | 1/2024 | Arora | ................. G06F 11/1451 |
| 2023/0418713 | A1 | 12/2023 | Arora et al. | |

OTHER PUBLICATIONS

Extended European Search Report for Application No. EP22187902. 6, mailed on May 24, 2023, 10 pages.

* cited by examiner

*Primary Examiner* — Jason B Bryan
(74) *Attorney, Agent, or Firm* — Harrity & Harrity, LLP

(57) ABSTRACT

A network device may execute a master application shared with another network device via a session, and may receive, by a backup application replication kernel, a replicated data object. The backup application replication kernel may provide the replicated data object to a backup application, and may calculate a time delta between when the replicated data object is received and when the replicated data object is consumed by the backup application. The backup application replication kernel may determine whether the time delta exceeds a first threshold or a second threshold, and may generate a session flag based on the time delta exceeding the first threshold or the second threshold. The backup application replication kernel may provide the session flag to a master application replication kernel and to the backup application, and the master application replication kernel may provide details of the session to the master application and the backup application.

20 Claims, 13 Drawing Sheets

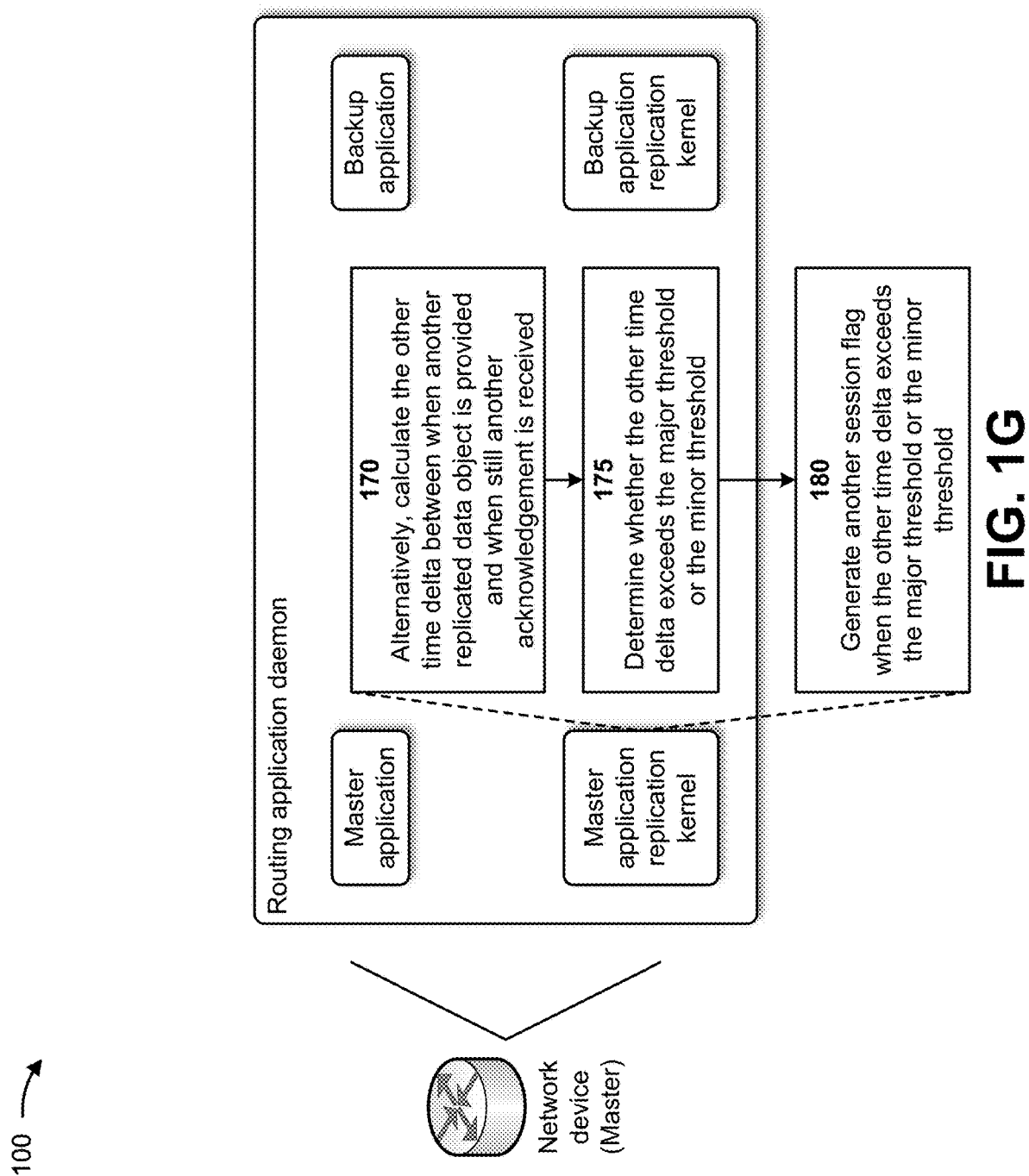

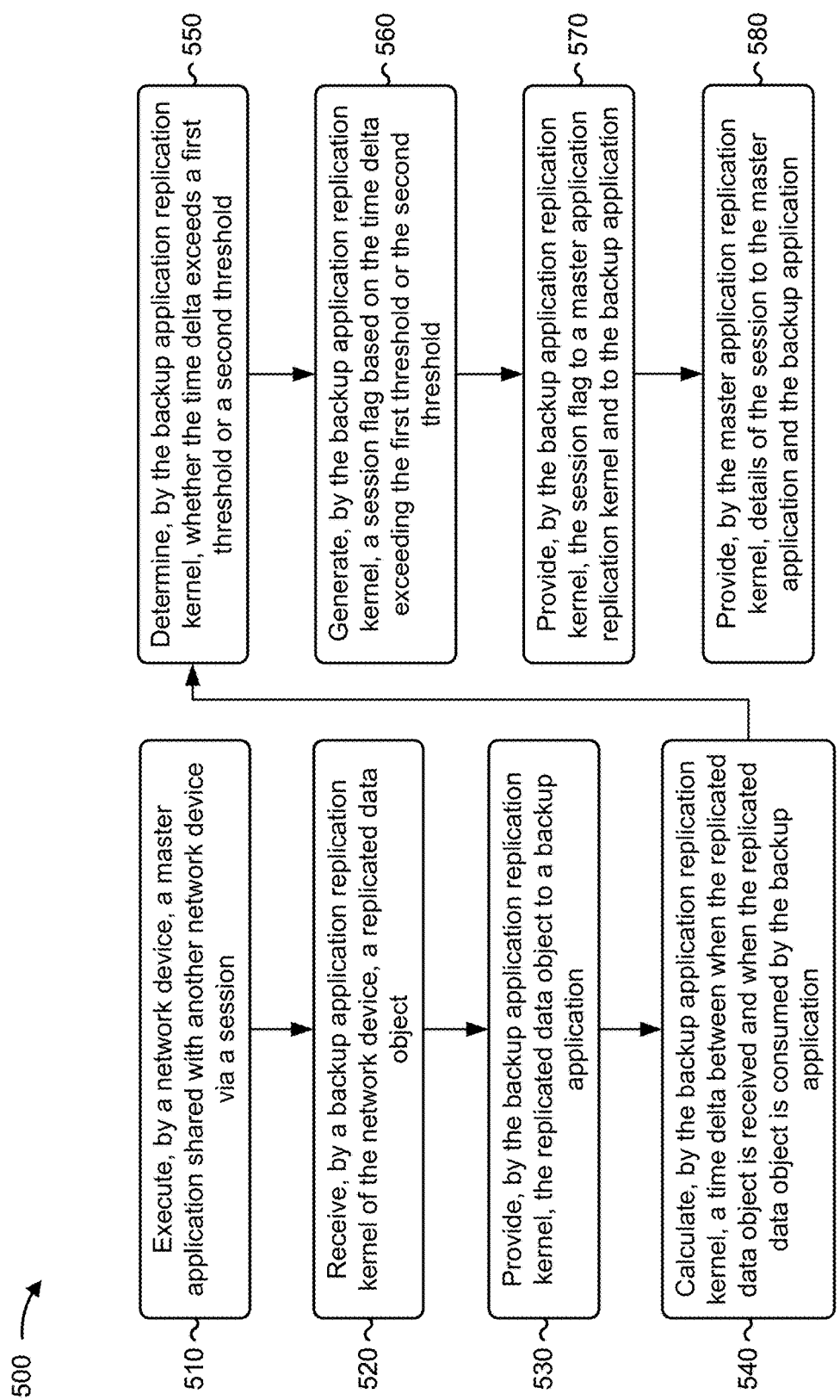

MAKING TRANSMISSION CONTROL PROTOCOL (TCP) SESSIONS ROBUST IN A SOCKET REPLICATION ENVIRONMENT

RELATED APPLICATION

This application is a continuation of U.S. patent application Ser. No. 17/837,355, filed Jun. 10, 2022, which is incorporated herein by reference in its entirety.

BACKGROUND

Non-stop active routing (NSR) is built upon a graceful routing engine switchover (GRES) framework to provide high availability to routing protocols.

SUMMARY

Some implementations described herein relate to a method. The method may include executing a master application of a network device that is shared with another network device via a session, and receiving, by a backup application replication kernel of the network device, a replicated data object. The method may include providing, by the backup application replication kernel, the replicated data object to a backup application, and calculating, by the backup application replication kernel, a time delta between when the replicated data object is received and when the replicated data object is consumed by the backup application. The method may include determining, by the backup application replication kernel, whether the time delta exceeds a first threshold or a second threshold, and generating, by the backup application replication kernel, a session flag based on the time delta exceeding the first threshold or the second threshold. The method may include providing, by the backup application replication kernel, the session flag to a master application replication kernel and to the backup application, and providing, by the master application replication kernel, details of the session to the master application and the backup application.

Some implementations described herein relate to a network device. The network device may include one or more memories and one or more processors. The one or more processors may be configured to execute a master application shared with another network device via a session, and receive, by a backup application replication kernel, a replicated data object. The one or more processors may be configured to provide, by the backup application replication kernel, the replicated data object to a backup application, and calculate, by the backup application replication kernel, a time delta between when the replicated data object is received and when the replicated data object is consumed by the backup application. The one or more processors may be configured to determine, by the backup application replication kernel, whether the time delta exceeds a first threshold or a second threshold, and generate, by the backup application replication kernel, a session flag based on the time delta exceeding the first threshold or the second threshold. The one or more processors may be configured to provide, by the backup application replication kernel, the session flag to a master application replication kernel and to the backup application, and provide, by the master application replication kernel, details of the session to the master application and the backup application. The one or more processors may be configured to cease, by the master application replication kernel, replication of the session based on the details of the session.

Some implementations described herein relate to a non-transitory computer-readable medium that stores a set of instructions for a network device. The set of instructions, when executed by one or more processors of the network device, may cause the network device to execute a master application shared with another network device via a session, and receive, by a backup application replication kernel, a replicated data object. The set of instructions, when executed by one or more processors of the network device, may cause the network device to provide, by the backup application replication kernel, the replicated data object to a backup application, and calculate, by the backup application replication kernel, a time delta between when the replicated data object is received and when the replicated data object is consumed by the backup application. The set of instructions, when executed by one or more processors of the network device, may cause the network device to determine, by the backup application replication kernel, whether the time delta exceeds a first threshold or a second threshold, and generate, by the backup application replication kernel, a session flag based on the time delta exceeding the first threshold or the second threshold. The set of instructions, when executed by one or more processors of the network device, may cause the network device to provide, by the backup application replication kernel, the session flag to a master application replication kernel and to the backup application, and provide, by the master application replication kernel, details of the session to the master application and the backup application.

BRIEF DESCRIPTION OF THE DRAWINGS

FIGS. 1A-1I are diagrams of an example associated with making transmission control protocol sessions robust in a socket replication environment.

FIG. 5 is a flowchart of an example process for making transmission control protocol sessions robust in a socket replication environment.

DETAILED DESCRIPTION

Figure 1A:
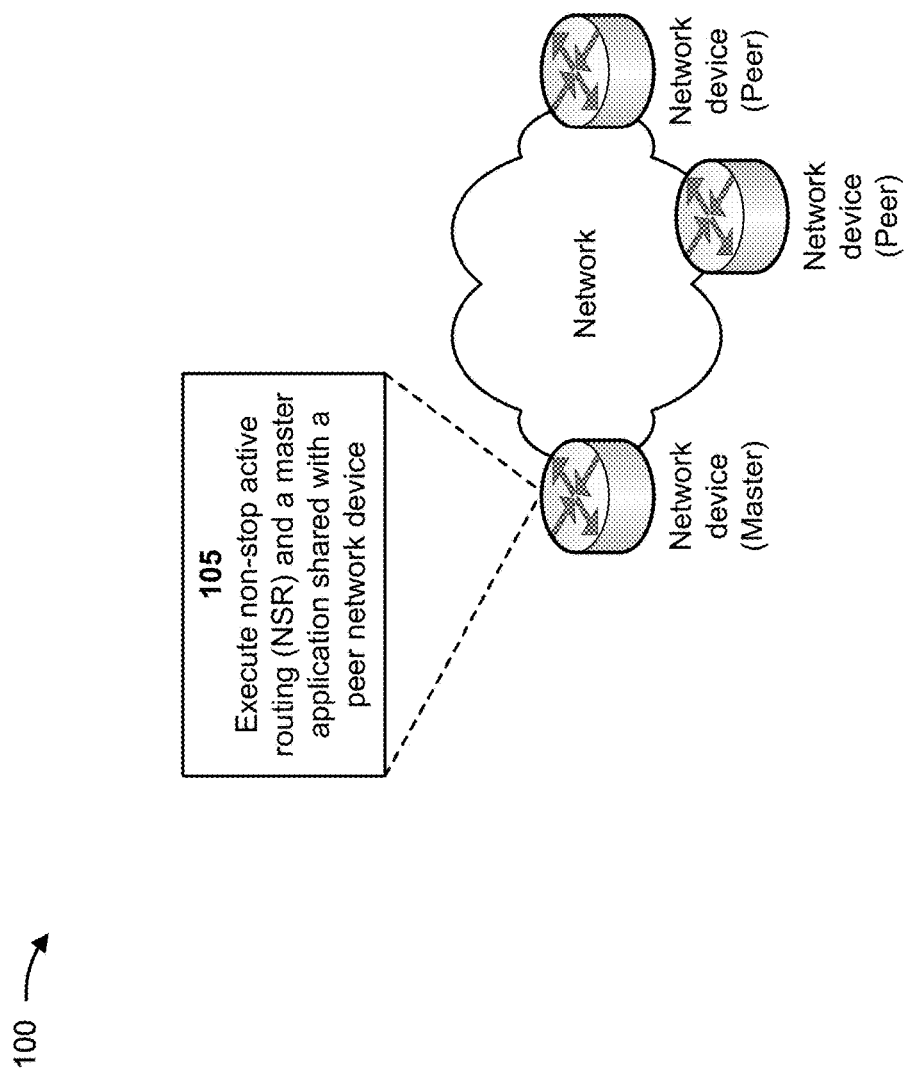

The following detailed description of example implementations refers to the accompanying drawings. The same reference numbers in different drawings may identify the same or similar elements.

GRES provides availability of interface and kernel state information on a standby routing engine of a network device. Unlike GRES, NSR causes a routing application daemon to execute in a standby mode, and causes routing protocol information to be maintained. NSR may provide a socket replication layer, within a kernel, that guarantees replication of any ingress and/or egress protocol packets to the standby routing engine of the network device. A highly-scaled network device may include thousands of NSR sessions and each NSR session may perform input and output at a high rate. However, any of the NSR sessions may flap (e.g., become unstable) due to a variety of reasons, such as a slow or stuck backup (e.g., standby) application (e.g., resulting in a standby routing engine not acknowledging replicated data within a hold time), an overwhelming data replication rate beyond a capacity of the socket replication layer (e.g., due to a master application being unable to satisfy a pace of incoming and/or outgoing data with respect to replication to the backup application, the backup application not being able to process replicated data at a desired rate, etc.), and/or the like. NSR may replicate ingress and/or egress data for all sessions to the backup application, a few sessions doing heavy input and output may impact other sessions (e.g., low resiliency sessions).

Current techniques for monitoring a network device fail to detect NSR session flaps, and fail to provide NSR session flap feedback to the master application for corrective actions. Thus, current techniques for monitoring a network devices consume computing resources (e.g., processing resources, memory resources, communication resources, and/or the like), networking resources, and/or the like, associated with failing to detect NSR session flaps, failing to provide feedback associated with the NSR session flaps, failing to correct the NSR session flaps due to the lack of feedback, losing an NSR session due to an NSR session flap, losing traffic due to an NSR session flap, and/or the like.

Some implementations described herein relate to a network device that makes transmission control protocol sessions robust in a socket replication environment of the network device. For example, a network device may execute a master application shared with another network device via a session, and may receive, by a backup application replication kernel of the network device, a replicated data object. The backup application replication kernel may provide the replicated data object to a backup application, and may calculate a time delta between when the replicated data object is received and when the replicated data object is consumed by the backup application. The backup application replication kernel may determine whether the time delta exceeds a first threshold or a second threshold, and may generate a session flag based on the time delta exceeding the first threshold or the second threshold. The backup application replication kernel may provide the session flag to a master application replication kernel and to the backup application, and the master application replication kernel may provide details of the session to the master application and the backup application.

In this way, the network device makes transmission control protocol sessions robust in a socket replication environment of the network device. For example, the network device may automatically detect choke points for potential NSR flaps in a socket replication layer of the network device, and choke points caused by a slow and/or stuck backup application. The network device may utilize a session hold time to prevent the potential NSR flaps from occurring, and may provide, to a master application, feedback that causes the master application to perform one or more actions on troubled sessions (e.g., with potential NSR flaps). The feedback may prevent the potential NSR flaps and lost traffic associated with the potential NSR flaps. Thus, the network device conserves computing resources, networking resources, and/or the like that would otherwise have been consumed by failing to detect NSR session flaps, failing to provide feedback associated with the NSR session flaps, failing to correct the NSR session flaps due to the lack of feedback, losing an NSR session due to an NSR session flap, losing traffic due to an NSR session flap, and/or the like.

FIGS. 1A-1I are diagrams of an example 100 associated with making transmission control protocol sessions robust in a socket replication environment. As shown in FIGS. 1A-1I, example 100 includes a network with a plurality of network devices. Further details of the network and the network devices are provided elsewhere herein.

As shown in FIG. 1A, and by reference number 105, the network device may execute NSR and a master application shared with a peer network device.

Figure 1B:
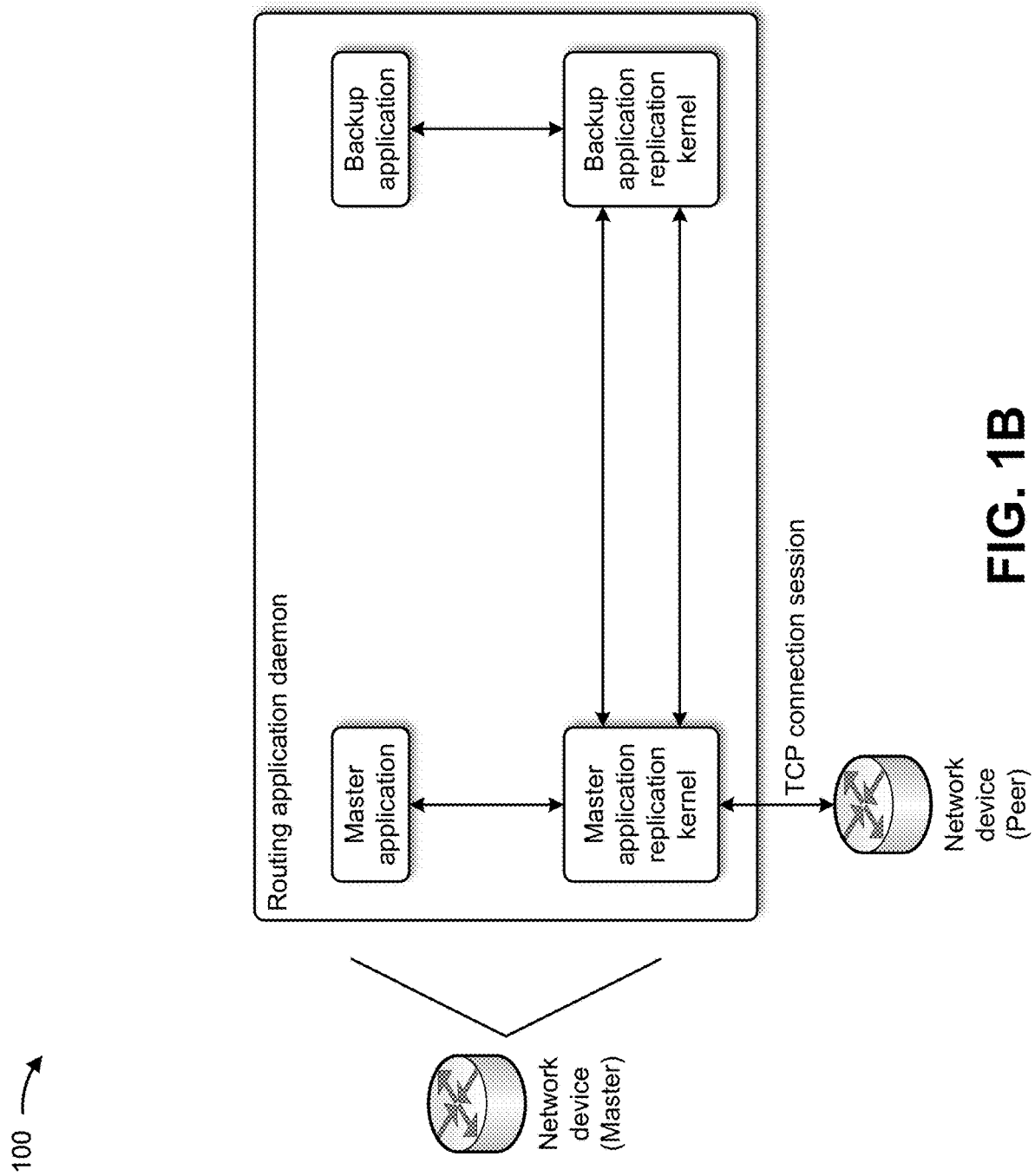

As shown in FIG. 1B, the network device may include a routing application daemon that includes a master application, . . . .

Figure 1C:
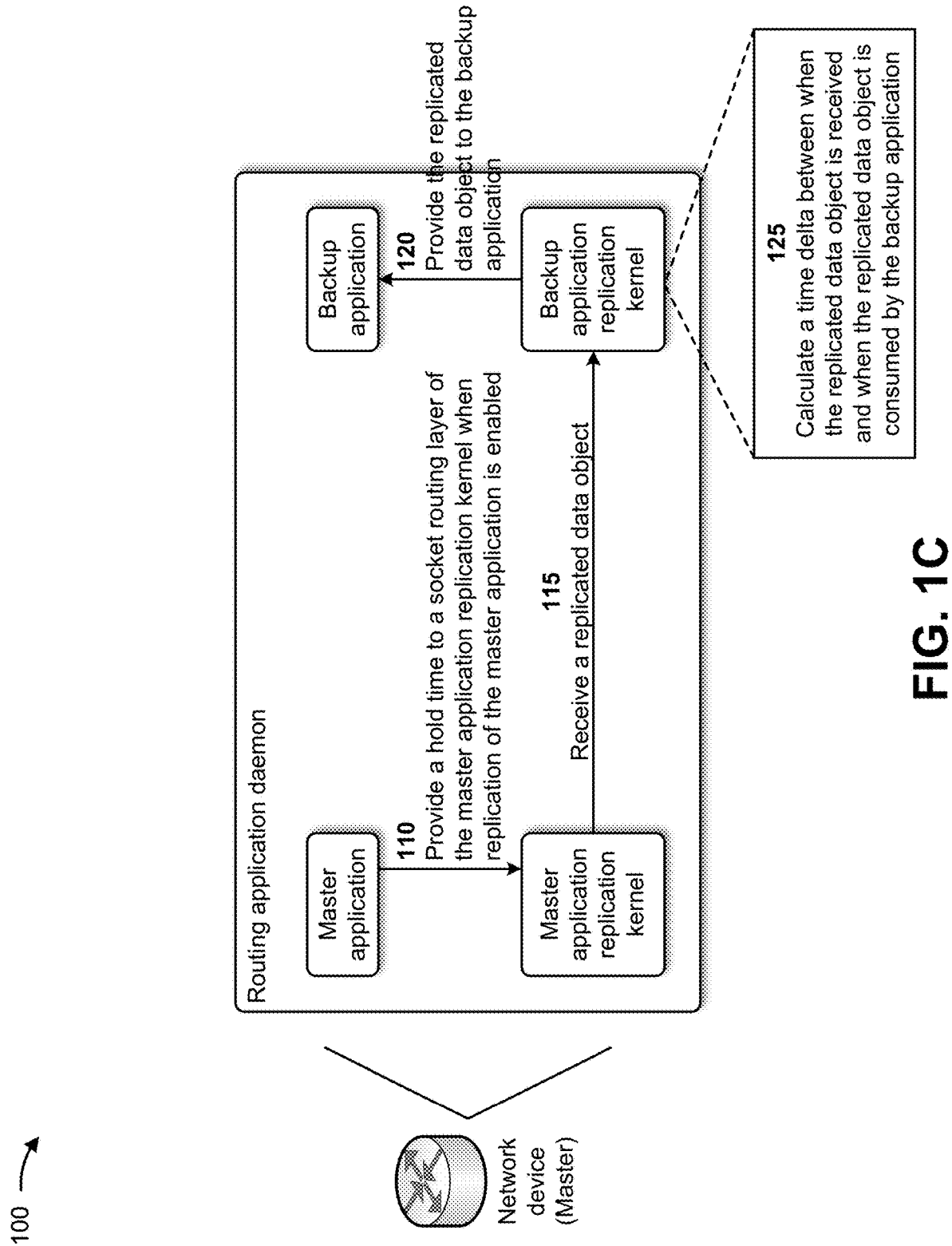

As shown in FIG. 1C, and by reference number 110, the master application of the network device may provide a hold time to a socket routing layer of the master application replication kernel when replication of the master application is enabled.

As further shown in FIG. 1C, and by reference number 115, the backup application replication kernel of the network device may receive a replicated data object.

As further shown in FIG. 1C, and by reference number 120, the backup application replication kernel of the network device may provide the replicated data object to the backup application.

As further shown in FIG. 1C, and by reference number 125, the backup application replication kernel of the network device may calculate a time delta between when the replicated data object is received and when the replicated data object is consumed by the backup application.

Figure 1D:
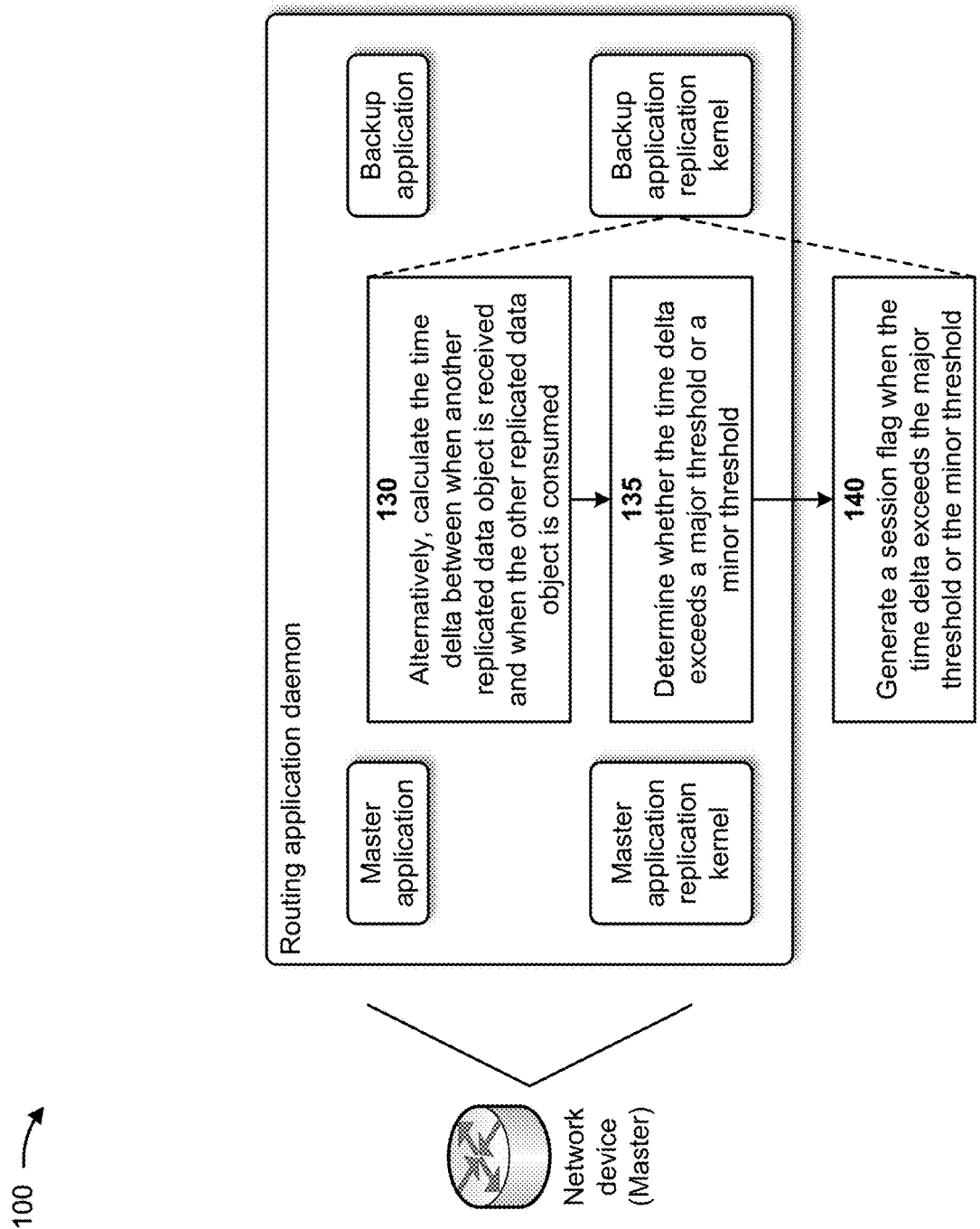

As shown in FIG. 1D, and by reference number 130, the backup application replication kernel of the network device may, alternatively, calculate the time delta between when another replicated data object is received from the master application replication kernel and when the other replicated data object is consumed by the backup application.

As further shown in FIG. 1D, and by reference number 135, the backup application replication kernel of the network device may determine whether the time delta exceeds a major threshold or a minor threshold.

As further shown in FIG. 1D, and by reference number 140, the backup application replication kernel of the network device may generate a session flag when the time delta exceeds the major threshold or the minor threshold.

Figure 1E:
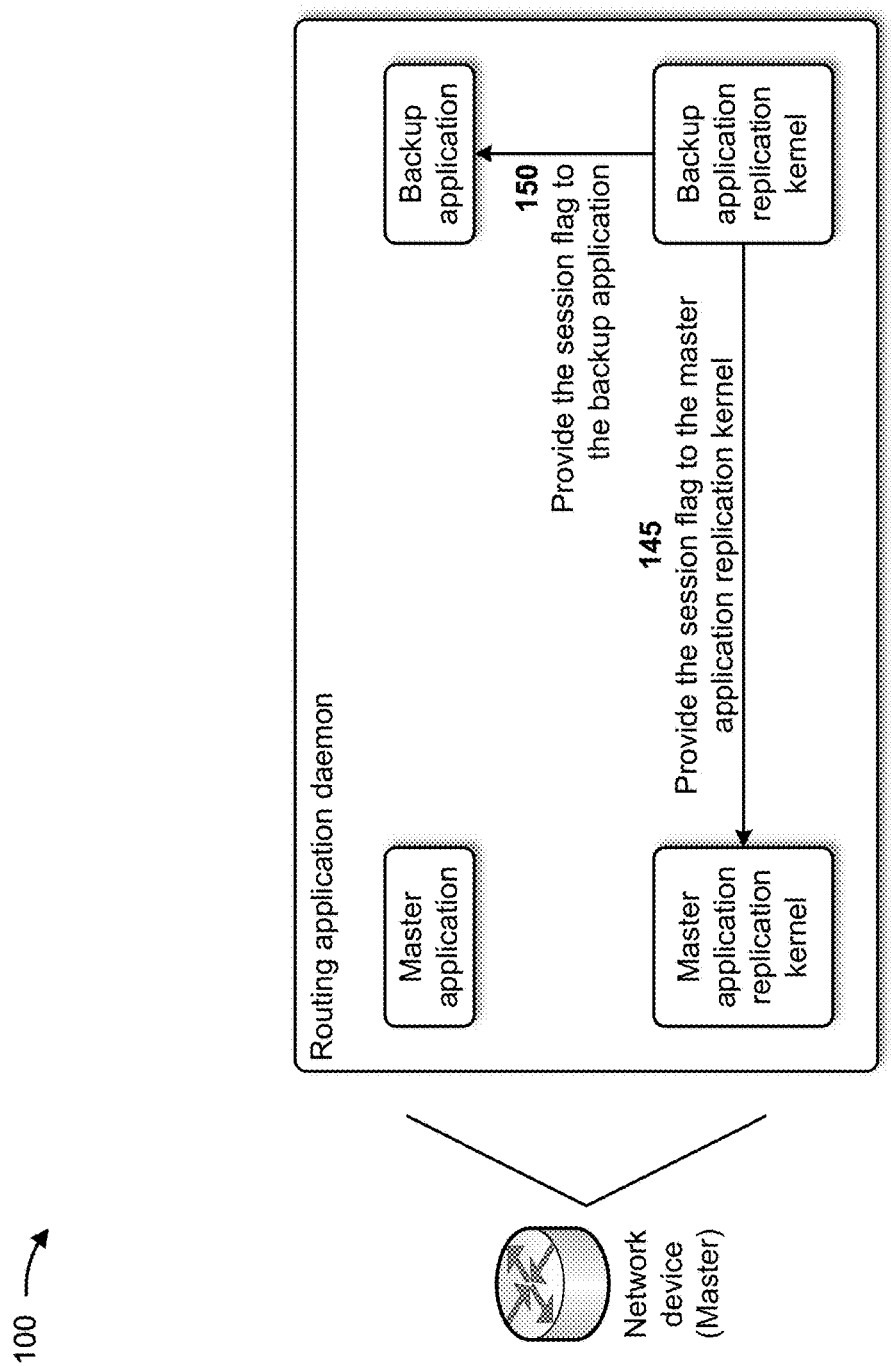

As shown in FIG. 1E, and by reference number 145, the backup application replication kernel of the network device may provide the session flag to the master application replication kernel.

As further shown in FIG. 1E, and by reference number 150, the backup application replication kernel of the network device may provide the session flag to the backup application.

Figure 1F:
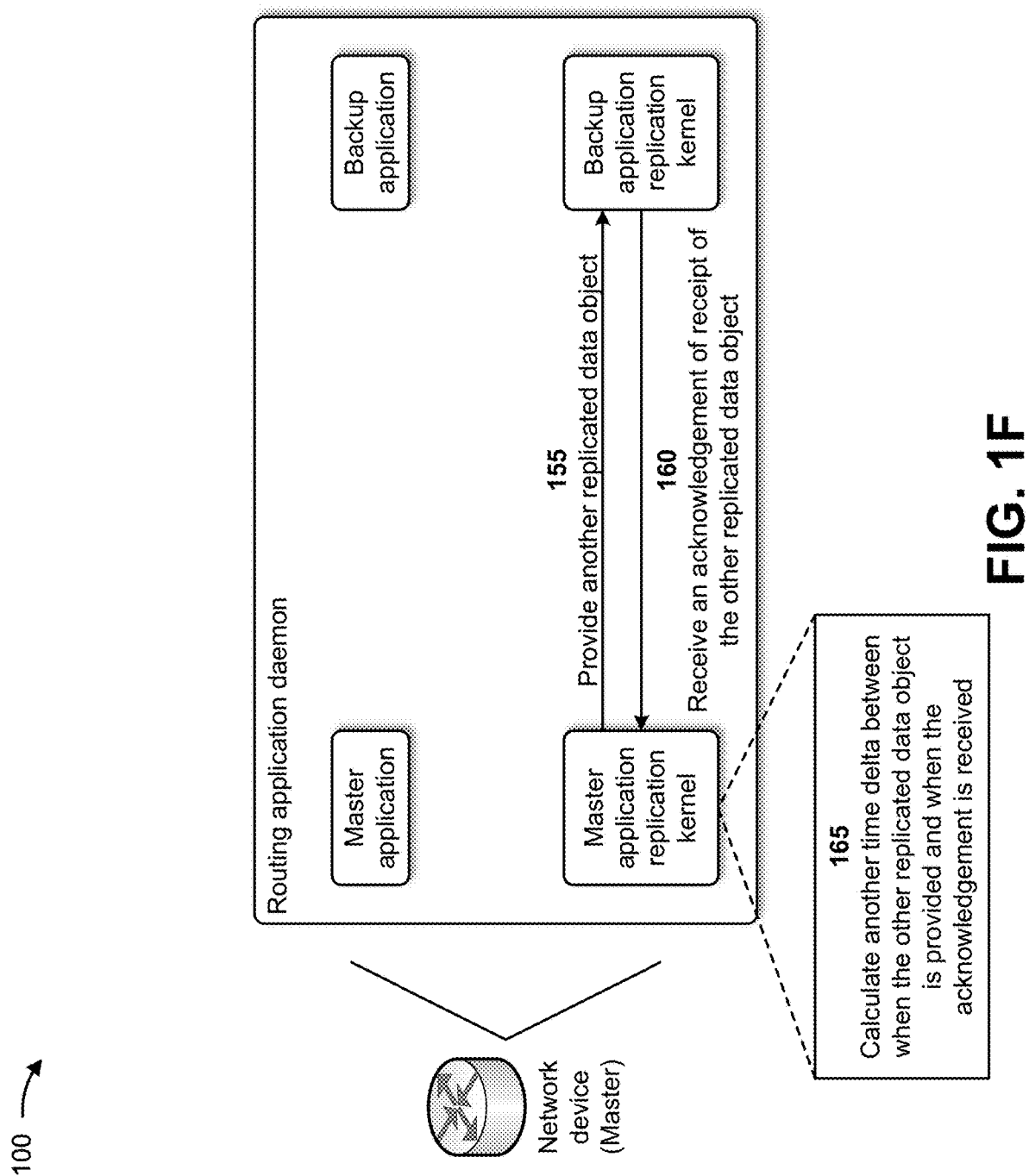

As shown in FIG. 1F, and by reference number 155, the master application replication kernel of the network device may provide another replicated data object to the backup application replication kernel.

As further shown in FIG. 1F, and by reference number 160, the master application replication kernel of the network device may receive an acknowledgement of receipt of the other replicated data object.

As further shown in FIG. 1F, and by reference number 165, the master application replication kernel of the network device may calculate another time delta between when the other replicated data object is provided and when the acknowledgement is received.

As shown in FIG. 1G, and by reference number 170, the master application replication kernel of the network device may, alternatively, calculate the other time delta between when still another replicated data object is provided and when another acknowledgement is received.

As further shown in FIG. 1G, and by reference number 175, the master application replication kernel of the network device may determine whether the other time delta exceeds the major threshold or the minor threshold.

As further shown in FIG. 1G, and by reference number 180, the master application replication kernel of the network device may generate another session flag when the other time delta exceeds the major threshold or the minor threshold.

Figure 1H:
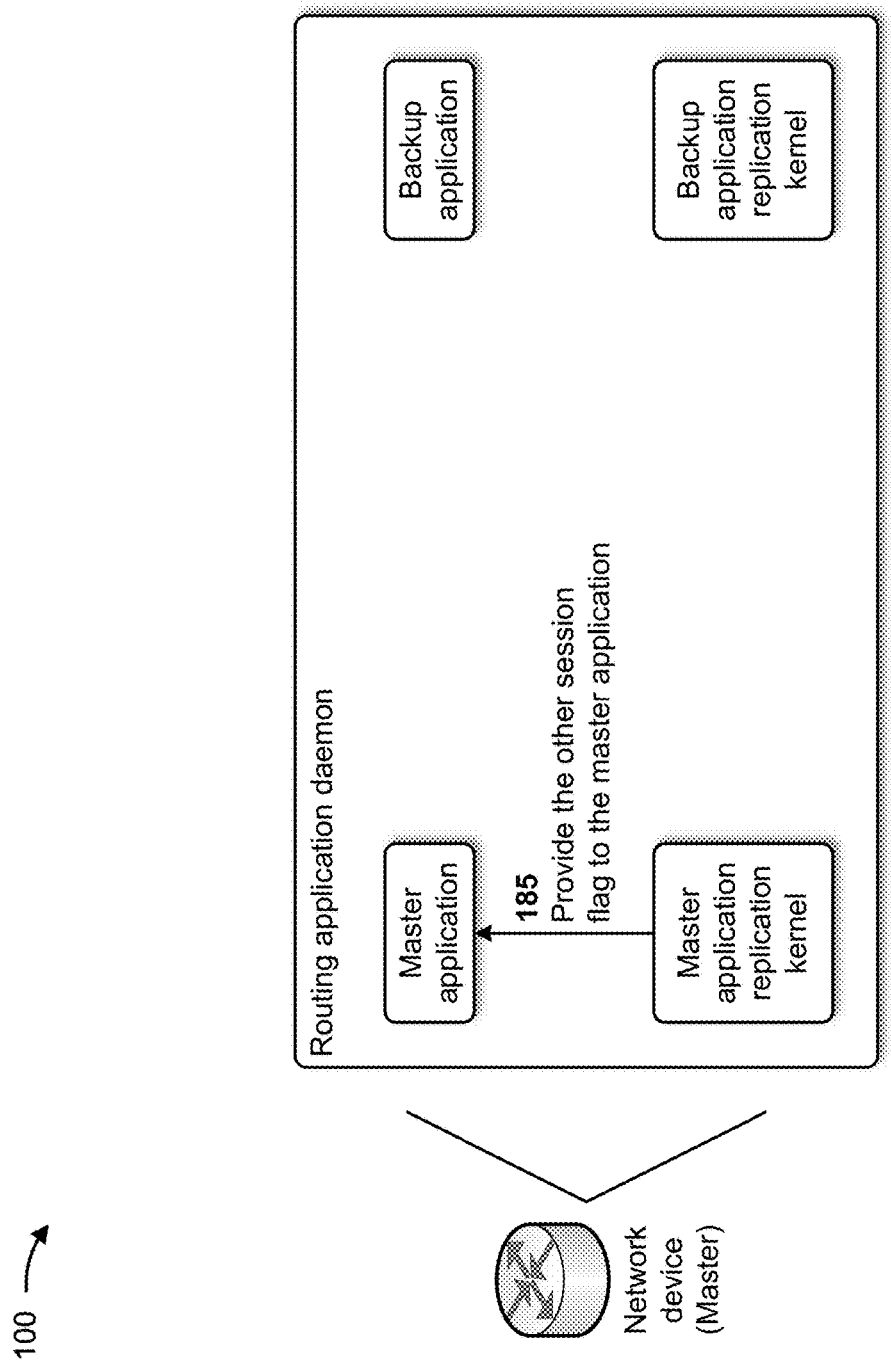

As shown in FIG. 1H, and by reference number 185, the master application replication kernel of the network device may provide the other session flag to the master application.

Figure 1I:
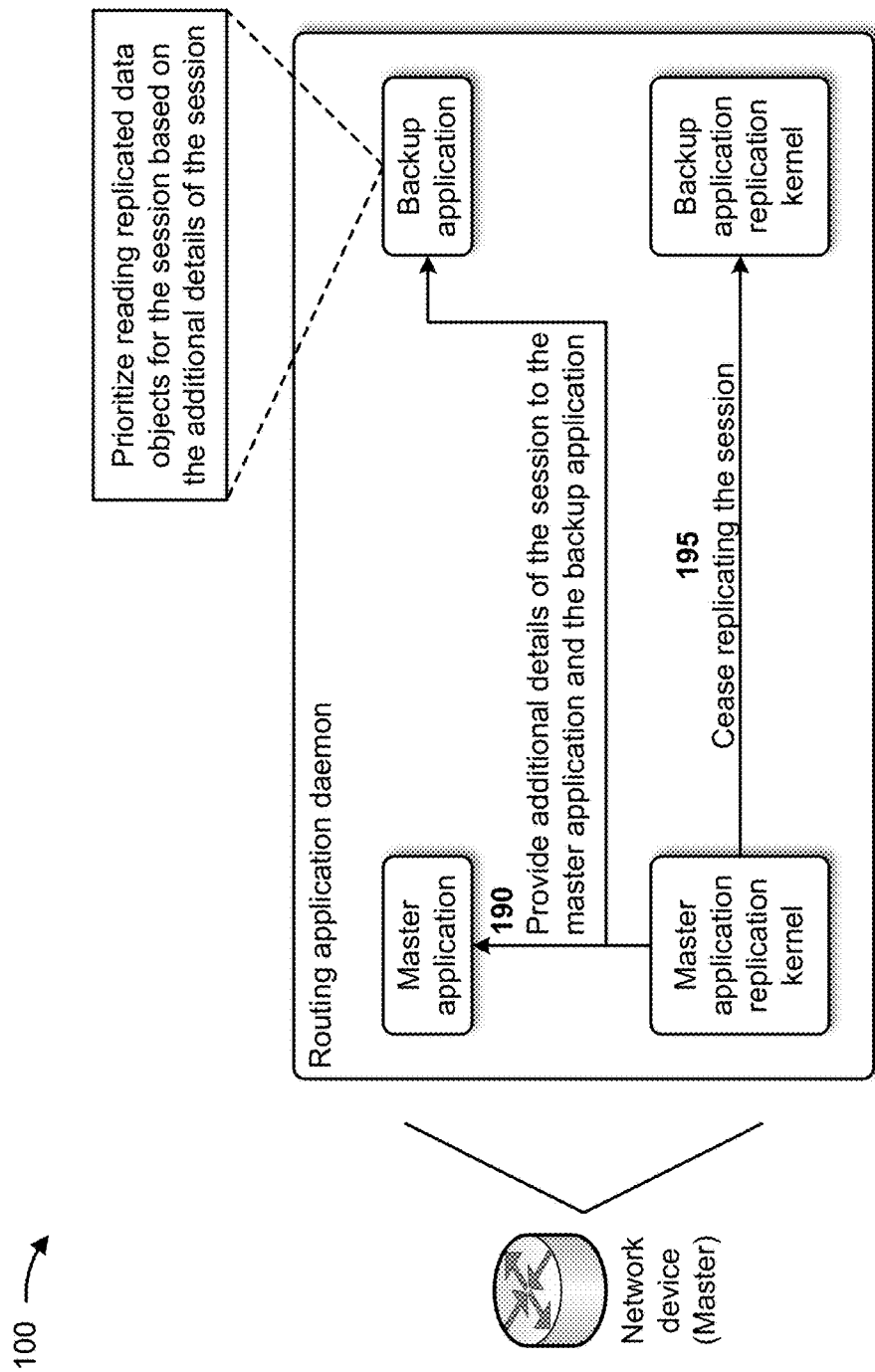

As shown in FIG. 1I, and by reference number 190, the master application replication kernel of the network device may provide additional details of the session to the master application and the backup application.

As further shown in FIG. 1I, and by reference number 195, the master application replication kernel of the network device may cease replicating the session.

As further shown in FIG. 1I, the backup application of the network device may prioritize reading replicated data objects for the session based on the additional details of the session.

In this way, the network device makes transmission control protocol sessions robust in a socket replication environment of the network device. For example, the network device may automatically detect choke points for potential NSR flaps in a socket replication layer of the network device, and choke points caused by a slow and/or stuck backup application. The network device may utilize a session hold time to prevent the potential NSR flaps from occurring, and may provide, to a master application, feedback that causes the master application to perform one or more actions on troubled sessions (e.g., with potential NSR flaps). The feedback may prevent the potential NSR flaps and lost traffic associated with the potential NSR flaps. Thus, the network device conserves computing resources, networking resources, and/or the like that would otherwise have been consumed by failing to detect NSR session flaps, failing to provide feedback associated with the NSR session flaps, failing to correct the NSR session flaps due to the lack of feedback, losing an NSR session due to an NSR session flap, losing traffic due to an NSR session flap, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
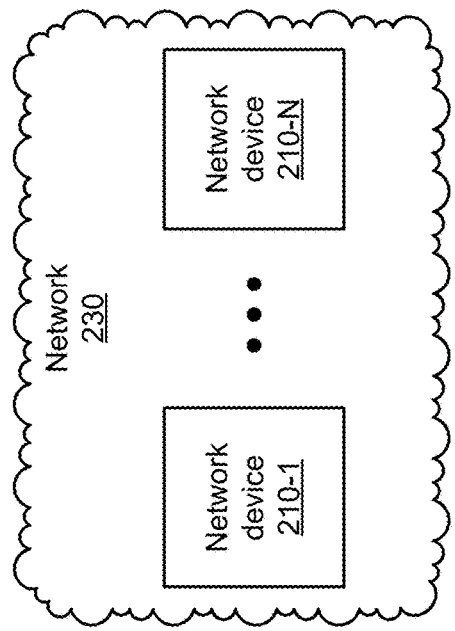
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as network device 210-1 through network device 210-N) and a network 220. Devices of the environment 200 may interconnect via wired connections, wireless connections, or a combination of wired and wireless connections.

The network device 210 includes one or more devices capable of receiving, processing, storing, routing, and/or providing traffic (e.g., a packet or other information or metadata) in a manner described herein. For example, the network device 210 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 210 may include a gateway, a switch, a firewall, a hub, a bridge, a reverse proxy, a server (e.g., a proxy server, a cloud server, or a data center server), a load balancer, and/or a similar device. In some implementations, the network device 210 may be a physical device implemented within a housing, such as a chassis. In some implementations, the network device 210 may be a virtual device implemented by one or more computer devices of a cloud computing environment or a data center. In some implementations, a group of network devices 210 may be a group of data center nodes that are used to route traffic flow through the network 220.

The network 220 includes one or more wired and/or wireless networks. For example, the network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
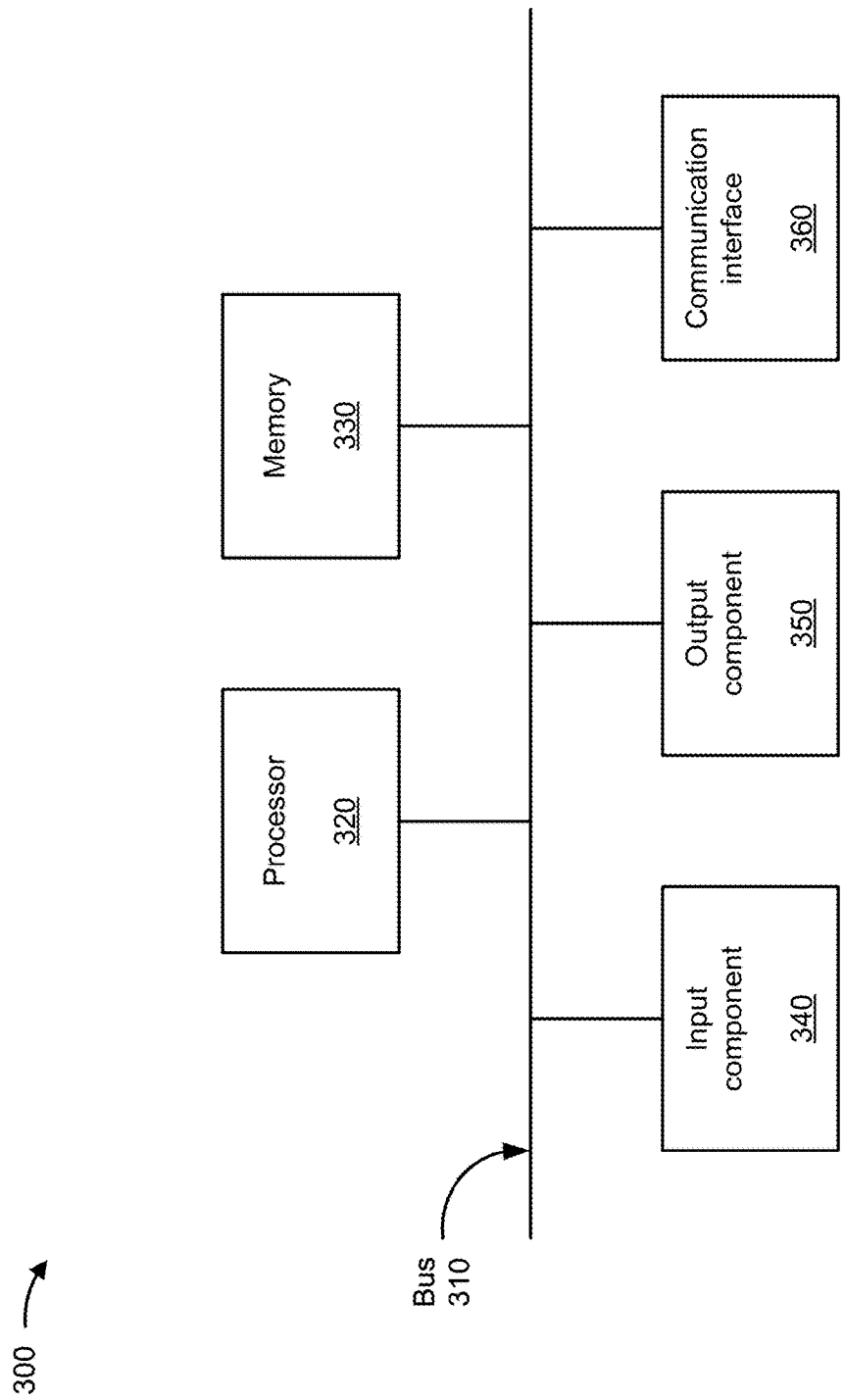
FIGS. 3 and 4 are diagrams of example components of one or more devices of FIG. 2.

FIG. 3 is a diagram of example components of one or more devices of FIG. 2. The example components may be included in a device 300, which may correspond to the network device 210. In some implementations, the network device 210 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
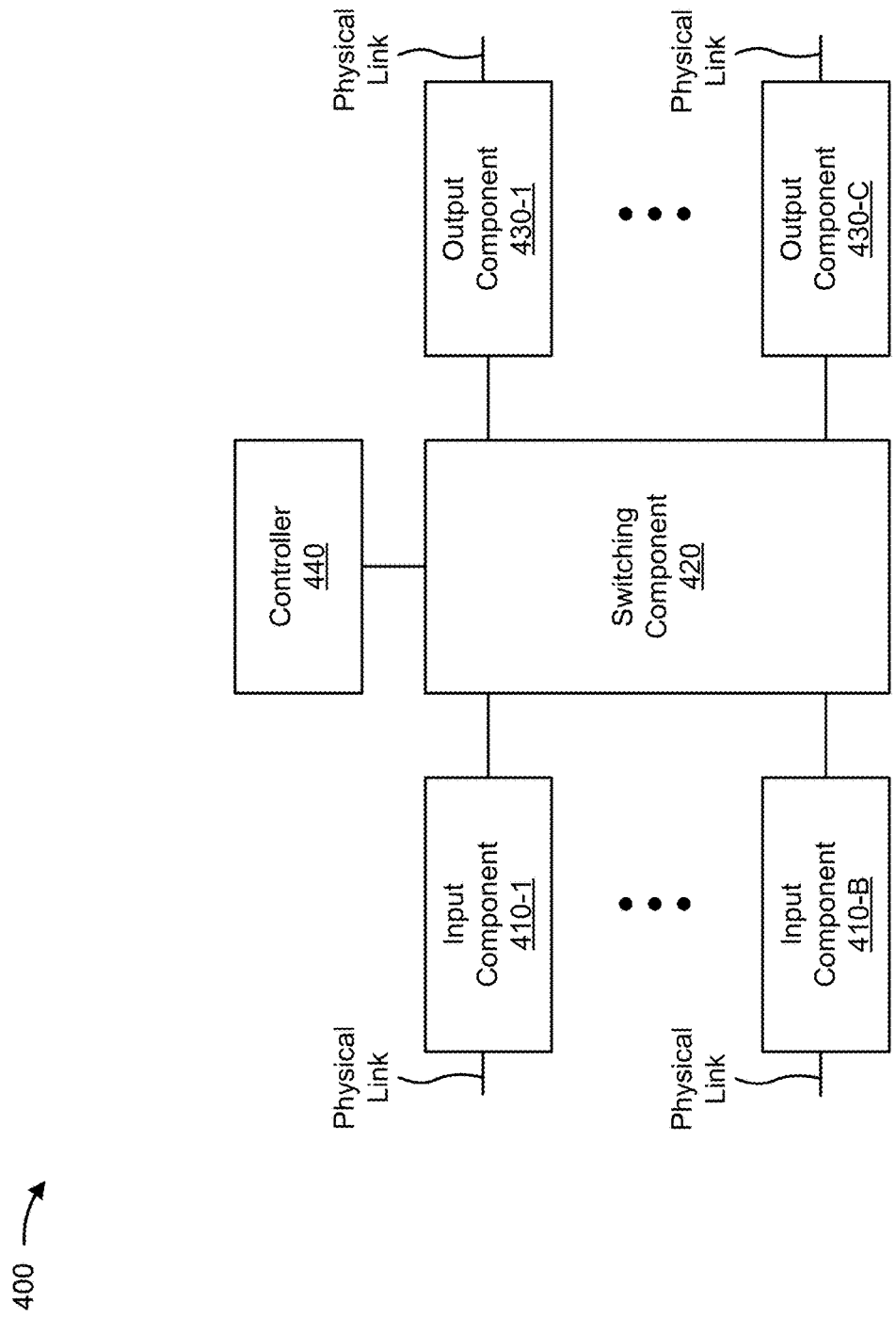

FIG. 4 is a diagram of example components of one or more devices of FIG. 2. The example components may be included in a device 400. The device 400 may correspond to the network device 210. In some implementations, the network device 210 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for making transmission control protocol sessions robust in a socket replication environment. In some implementations, one or more process blocks of FIG. 5 may be performed by a network device (e.g., the network device 210). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include executing, by a network device, a master application shared with another network device via a session (block 510). For example, the network device may execute a master application shared with another network device via a session, as described above.

As further shown in FIG. 5, process 500 may include receiving, by a backup application replication kernel of the network device, a replicated data object (block 520). For example, the backup application replication kernel of the network device may receive a replicated data object, as described above. In some implementations, the replicated data object stores information identifying a first time when the replicated data object is received by the backup application replication kernel and a second time when the replicated data object is consumed by the backup application.

As further shown in FIG. 5, process 500 may include providing, by the backup application replication kernel, the replicated data object to a backup application (block 530). For example, the backup application replication kernel may provide the replicated data object to a backup application, as described above.

As further shown in FIG. 5, process 500 may include calculating, by the backup application replication kernel, a time delta between when the replicated data object is received and when the replicated data object is consumed by the backup application (block 540). For example, the backup application replication kernel may calculate a time delta between when the replicated data object is received and when the replicated data object is consumed by the backup application, as described above.

As further shown in FIG. 5, process 500 may include determining, by the backup application replication kernel, whether the time delta exceeds a first threshold or a second threshold (block 550). For example, the backup application replication kernel may determine whether the time delta exceeds a first threshold or a second threshold, as described above. In some implementations, the first threshold is based on receipt of two keep alive periods at one time, and the second threshold is based on receipt of one keep alive period at two consecutive times.

As further shown in FIG. 5, process 500 may include generating, by the backup application replication kernel, a session flag based on the time delta exceeding the first threshold or the second threshold (block 560). For example, the backup application replication kernel may generate a session flag based on the time delta exceeding the first threshold or the second threshold, as described above.

As further shown in FIG. 5, process 500 may include providing, by the backup application replication kernel, the session flag to a master application replication kernel and to the backup application (block 570). For example, the backup application replication kernel may provide the session flag to a master application replication kernel and to the backup application, as described above.

As further shown in FIG. 5, process 500 may include providing, by the master application replication kernel, details of the session to the master application and the backup application (block 580). For example, the master application replication kernel may provide details of the session to the master application and the backup application, as described above.

In some implementations, process 500 includes calculating, by the backup application replication kernel, the time delta between when another replicated data object is received from the master application replication kernel and when the other replicated data object is consumed by the backup application. In some implementations, process 500 includes maintaining, by the master application replication kernel, a transmission control protocol session with the other network device.

In some implementations, process 500 includes providing, by the master application, a hold time to a socket routing layer of the master application replication kernel when replication of the master application is enabled. In some implementations, process 500 includes ceasing, by the master application replication kernel, replication of the session based on the details of the session. In some implementations, process 500 includes prioritizing, by the backup application, reading of replicated data objects for the session based on the details of the session.

In some implementations, process 500 includes ceasing replication of multiple sessions based on the details of the session. In some implementations, process 500 includes determining whether the time delta satisfies a third threshold, and causing, based on the time delta satisfying the third threshold, the session to be replicated in a manner corresponding to session replication prior to receipt of the replicated data object by the backup application replication kernel.

In some implementations, process 500 includes providing another replicated data object to the backup application replication kernel; receiving an acknowledgement of receipt of the other replicated data object; calculating another time delta between when the other replicated data object is provided and when the acknowledgement is received; determining whether the other time delta exceeds the first threshold or the second threshold; generating another session flag based on the other time delta exceeding the first threshold or the second threshold; and providing the other session flag to the master application. In some implementations, process 500 includes providing additional details of the session to the master application and the backup application. In some implementations, process 500 includes ceasing replication of the session based on the additional details of the session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, from a first layer of a device and by a second layer of the device, a replicated data object at a first time to enable a second application of the device to maintain a connection session if a first application of the device fails;
   causing, by the second layer, the replicated data object to be received by the second application at a second time;
   calculating, by the second layer, a time delta between the first time and the second time; and
   providing, by the second layer and based on the time delta satisfying a threshold, information indicating a potential chokepoint to the first layer and to the second application.

2. The method of claim 1, wherein the device is a non-stop active routing (NSR)-enabled network device.

3. The method of claim 1, wherein the replicated data object stores information identifying the first time and the second time.

4. The method of claim 1, wherein the connection session is a transmission control protocol (TCP) session.

5. The method of claim 1, wherein the threshold is a first threshold; and
   wherein the method further comprises:
      determining whether the time delta satisfies at least one of the first threshold or a second threshold; and
   wherein providing the information indicating the potential chokepoint to the first layer and to the second application comprises:
      providing the information indicating the potential chokepoint to the first layer and to the second application based on the time delta satisfying the at least one of the first threshold or the second threshold.

6. The method of claim 1, wherein the threshold is based on receipt of two keep alive periods at one time.

7. The method of claim 1, wherein the threshold is based on receipt of one keep alive period at two consecutive times.

8. A device, comprising:
   one or more memories; and
   one or more processors to:
      receive, from a first layer of the device and by a second layer of the device, a replicated data object at a first time to enable a second application of the device to maintain a connection session if a first application of the device fails;

cause, by the second layer, the replicated data object to be received by the second application at a second time;

calculate, by the second layer, a time delta between the first time and the second time; and provide, by the second layer and based on the time delta satisfying a threshold, information indicating a potential chokepoint to the first layer and to the second application.

9. The device of claim 8, wherein the device is a non-stop active routing (NSR)-enabled network device.

10. The device of claim 8, wherein the replicated data object stores information identifying the first time and the second time.

11. The device of claim 8, wherein the connection session is a transmission control protocol (TCP) session.

12. The device of claim 8, wherein the threshold is a first threshold; and wherein the one or more processors are to further:
 determine whether the time delta satisfies at least one of the first threshold or a second threshold; and wherein the one or more processors, to provide the information indicating the potential chokepoint to the first layer and to the second application, are to:
 provide the information indicating the potential chokepoint to the first layer and to the second application based on the time delta satisfying the at least one of the first threshold or the second threshold.

13. The device of claim 8, wherein the threshold is based on receipt of two keep alive periods at one time.

14. The device of claim 8, wherein the threshold is based on receipt of one keep alive period at two consecutive times.

15. A non-transitory computer-readable medium storing a set of instructions, the set of instructions comprising: one or more instructions that, when executed by one or more processors of a device, cause the device to:

receive, from a first layer of the device and by a second layer of the device, a replicated data object at a first time to enable a second application of the device to maintain a connection session if a first application of the device fails;

cause, by the second layer, the replicated data object to be received by the second application at a second time;

calculate, by the second layer, a time delta between the first time and the second time; and provide, by the second layer and based on the time delta satisfying a threshold, information indicating a potential chokepoint to the first layer and to the second application.

16. The non-transitory computer-readable medium of claim 15, wherein the device is a non-stop active routing (NSR)-enabled network device.

17. The non-transitory computer-readable medium of claim 15, wherein the replicated data object stores information identifying the first time and the second time.

18. The non-transitory computer-readable medium of claim 15, wherein the connection session is a transmission control protocol (TCP) session.

19. The non-transitory computer-readable medium of claim 16, wherein the threshold is based on receipt of two keep alive periods at one time.

20. The non-transitory computer-readable medium of claim 15, wherein the threshold is based on receipt of one keep alive period at two consecutive times.

* * * * *